United States Patent
Desai et al.

(10) Patent No.: US 12,056,414 B2
(45) Date of Patent: Aug. 6, 2024

(54) MANAGING MEDIA CONTENT IN MULTI-DISPLAY SYSTEMS

(71) Applicant: Motorola Mobility LLC, Chicago, IL (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/563,426

(22) Filed: Dec. 28, 2021

(65) Prior Publication Data

US 2023/0205476 A1 Jun. 29, 2023

(51) Int. Cl.
*G06F 3/14* (2006.01)
*G06V 20/52* (2022.01)
*H04M 1/72454* (2021.01)
*H04N 23/61* (2023.01)
*H04N 23/90* (2023.01)

(52) U.S. Cl.
CPC ............ *G06F 3/1423* (2013.01); *G06V 20/52* (2022.01); *H04M 1/72454* (2021.01); *H04N 23/61* (2023.01); *H04N 23/90* (2023.01); *H04M 2250/16* (2013.01)

(58) Field of Classification Search
CPC .... G06F 3/1423; G06F 3/0488; G06F 3/1446; G06F 1/1626; G06F 3/04845; G06F 3/044; G06F 1/1677; G06F 3/14; G06V 20/52; H04M 1/72454; H04M 2250/16; H04N 23/61; H04N 23/90; G06T 3/40; G06T 3/60

See application file for complete search history.

(56) References Cited

U.S. PATENT DOCUMENTS

| | | | |
|---|---|---|---|
| 9,807,213 B2 | 10/2017 | Stewart | |
| 10,063,677 B2 | 8/2018 | Cavallaro et al. | |
| 11,968,319 B2 | 4/2024 | Desai et al. | |
| 2008/0161061 A1* | 7/2008 | You | H04M 1/0208 455/566 |
| 2012/0183154 A1 | 7/2012 | Boemer et al. | |
| 2015/0022469 A1* | 1/2015 | Mhun | H04M 1/72454 345/173 |
| 2015/0221065 A1* | 8/2015 | Kim | G09G 3/2092 345/660 |
| 2018/0018753 A1 | 1/2018 | McLaughlin et al. | |
| 2018/0329672 A1* | 11/2018 | Sadak | G06F 3/0487 |

(Continued)

OTHER PUBLICATIONS

Agrawal, Amit Kumar, et al., "US Application as Filed", U.S. Appl. No. 18/133,196, filed Apr. 11, 2023, 53 pages.

(Continued)

*Primary Examiner* — Pegeman Karimi
(74) *Attorney, Agent, or Firm* — FIG. 1 Patents

(57) ABSTRACT

Techniques for managing media content in multi-display systems are described. For instance, the described techniques can be implemented to manage media content in the context of a client device that includes two or more housings attached via a hinge region such that the housings are pivotable relative to one another. The described techniques, for example, enable dynamic configuration of output of media content based on changes in user position relative to a client device.

20 Claims, 12 Drawing Sheets

(56) References Cited

U.S. PATENT DOCUMENTS

| | | | |
|---|---|---|---|
| 2019/0189042 A1* | 6/2019 | Aurongzeb | ........... G06F 1/1681 |
| 2019/0311718 A1 | 10/2019 | Huber | |
| 2020/0089459 A1* | 3/2020 | Zhang | ..................... G06F 3/147 |
| 2021/0089686 A1* | 3/2021 | He | ....................... G06F 1/1641 |
| 2022/0066502 A1* | 3/2022 | Fujiwara | ............. G06F 3/04886 |
| 2022/0121413 A1* | 4/2022 | Zhang | ................... G06F 3/1446 |
| 2023/0208963 A1 | 6/2023 | Desai et al. | |

OTHER PUBLICATIONS

U.S. Appl. No. 17/563,456, "Non-Final Office Action", U.S. Appl. No. 17/563,456, filed Sep. 29, 2023, 16 pages.

U.S. Appl. No. 17/563,456, "Notice of Allowance", U.S. Appl. No. 17/563,456, filed Dec. 21, 2023, 6 pages.

\* cited by examiner

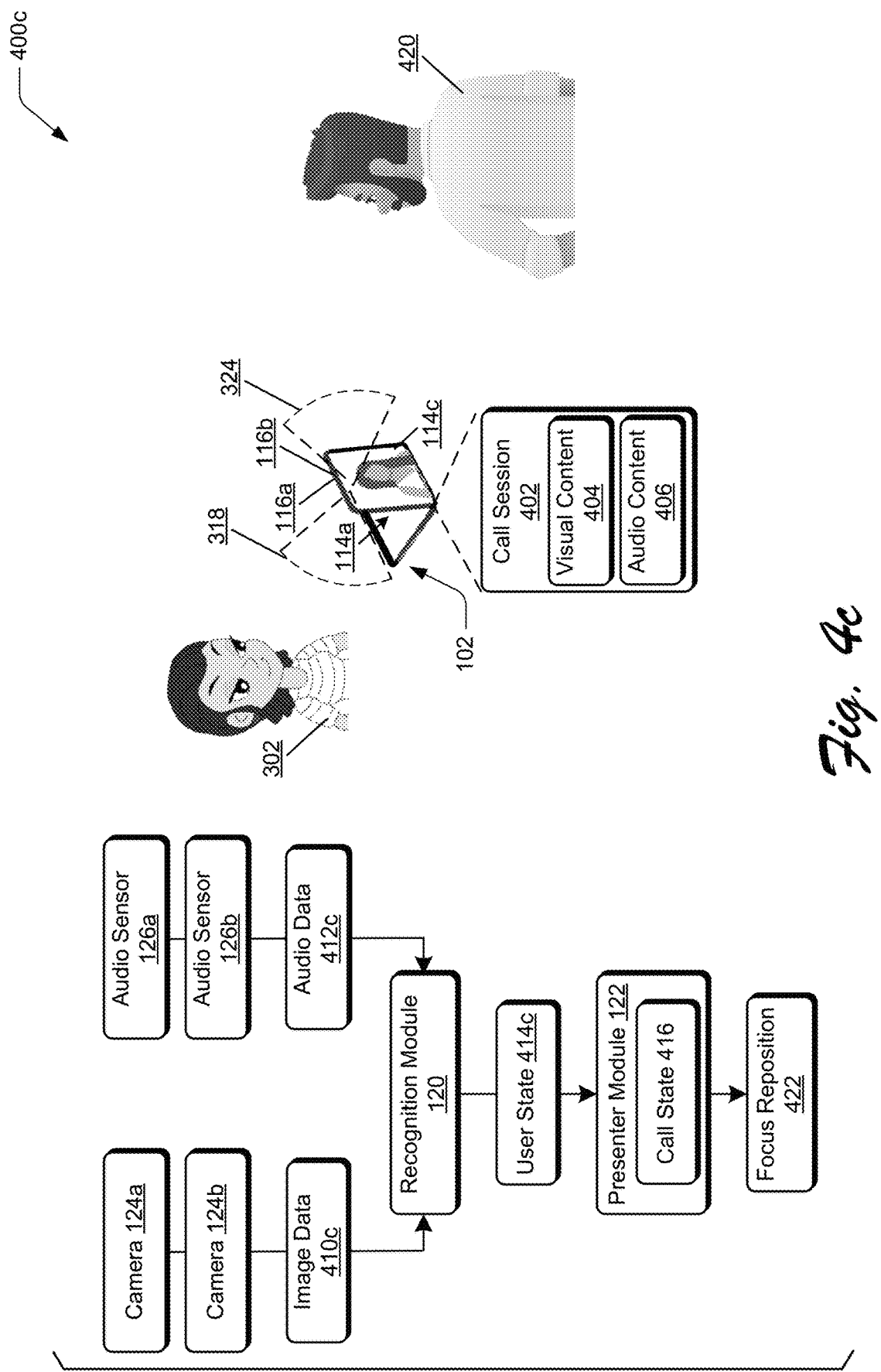

MANAGING MEDIA CONTENT IN MULTI-DISPLAY SYSTEMS

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. One particularly useful device form factor is a foldable device that provides users with portable communication and computing functionality in a highly portable form.

BRIEF DESCRIPTION OF THE DRAWINGS

Aspects of managing media content and call sessions in multi-display systems are described with reference to the following Figures. The same numbers may be used throughout to reference similar features and components that are shown in the Figures. Further, identical numbers followed by different letters reference different instances of features and components described herein:

FIG. 4c depicts an example system for adapting a call session for different users in accordance with one or more implementations.

DETAILED DESCRIPTION

Figure 1:
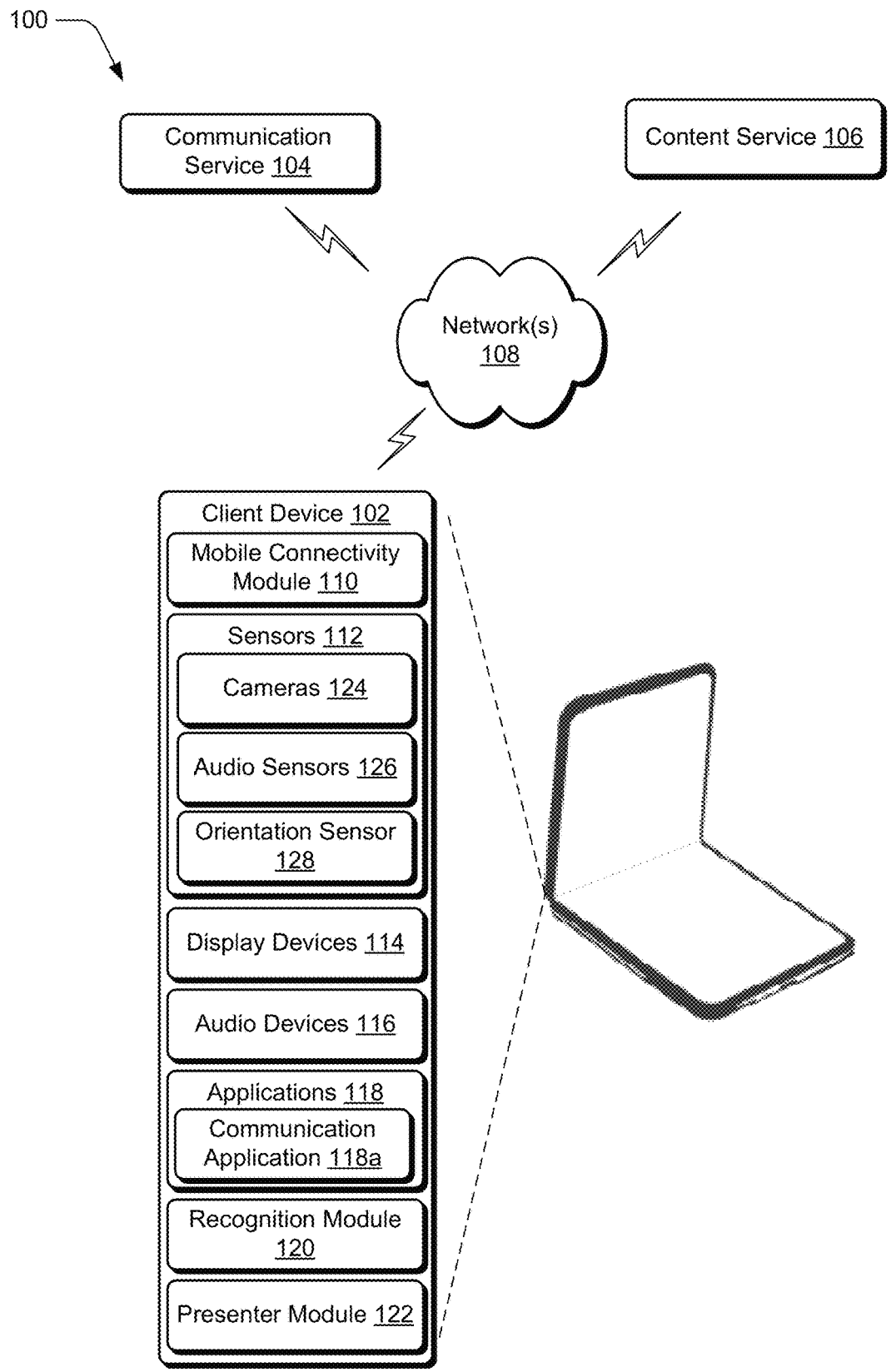
FIG. 1 illustrates an example environment in which aspects of managing media content and call sessions in multi-display systems can be implemented.

Techniques for managing media content and call sessions in multi-display systems are described. For instance, the described techniques can be implemented to manage media content and call sessions in the context of a client device that includes two or more housings attached via a hinge region such that the housings are pivotable relative to one another. The client device, for example, represents a foldable device, e.g., a foldable smartphone.

For instance, consider a scenario where the client device is positioned in an orientation such that a first housing is pivoted to an open position relative to a second housing. Further, the first housing includes a first display on a front surface of the housing and a second display on a rear surface of the housing. In this orientation, for example, the second housing can be placed on a surface (e.g., a table, a desk, etc.) such that the first display and the second display on the first housing are viewable from different respective perspectives. Alternatively or additionally, the client device can be fully opened such that the device is in a planar orientation, and placed on a dock or other device holding apparatus in a vertical orientation such that the first display and the second display are viewable from different respective orientations.

Further to this scenario, media content that includes video content and audio content is to be output by the client device. To determine how to present the media content, sensor data is captured at the client device and processed to determine that a user is positioned to view the first display. The sensor data, for instance, includes an image of a user captured via a camera and/or speech audio from the user captured by an audio sensor. Accordingly, based on detecting that the user is positioned to view the first display, the media content is output via the first display and an audio device positioned for audio output at the front surface of the housing.

During output of the media content via the first display, sensor data continues to be captured and indicates that the user moves relative to the first display, e.g., that the user moves out of a field of view of a camera positioned on the front surface of the housing. Further, the sensor data indicates that the user is now positioned such that the second display on the rear surface of the housing is viewable by the user. Accordingly, output of the media content is switched to the second display and an audio device positioned for audio output at the rear surface of the housing. In at least one implementation, in response to switching media output to the second display, output of the media content on the first display is paused or stopped. Such implementations enable output of media content to dynamically automatically adapt to changes in user position relative to a client device. Generally, various implementations are discussed herein in the context of a user changing positions relative to a client device, which can occur based on user movement, repositioning of the client device, and/or combinations thereof.

In another scenario, consider that a client device is positioned in an open position such as described above and a call session is implemented via the client device. The call session, for instance, represents a video and audio call with a remote device. Accordingly, based on determining that a user is positioned to view the first display, visual content of the call session is output on the first display and audio content of the call session is output by an audio device positioned for audio output at the front surface of the housing. Further, for the call session, a camera positioned on the front surface of the client device captures an image of the user and a first audio sensor captures speech content from the user. The user image and the speech content, for instance, are transmitted to a remote device participating in the call session.

Further to this scenario, sensor data being captured at the client device indicates that the user is repositioned such that the second display device is now viewable by the user. Accordingly, output of the call session is switched to the second display device and an audio device positioned for audio output at the rear surface of the housing. Further, for the call session, a camera positioned on the rear surface of the client device captures an image of the user and a second audio sensor captures speech content from the user. In at least one implementation, based on switching output of the call session to the second display device, output of the call session via the first display device is paused or stopped. According to various implementations, this enables output and input for a call session to adapt to changes in user position relative to a client device.

In another example implementation, consider that a client device is positioned in an open position such as described above and a call session is implemented that includes multiple users present in proximity to the client device. For instance, a first user is positioned to view the first display at the front surface and a second user is positioned to view the second display at the rear surface. In such scenarios the described techniques are able to adapt to changes in user input from the different users. For instance, when the first user is providing speech input for the call session, input focus is placed on the first user and content of the call session is output via the first display and an audio device at the front surface of the client device. The speech input from the first user, for example, is emphasized in audio data of the call session, such as by filtering out audio (e.g., noise) that does not originate from the first user. When the second user begins speaking, input focus is placed on the second user, such as by emphasizing speech input and/or video content from the second user as part of the call session. For instance, based on detecting the second user via speech input and/or image detection, content of the call session is output via the second display and an audio device at the rear surface of the client device. For instance, the call session is output at both the front surface and the rear surface of the client device. According to various implementations, this enables input and output for a call session to dynamically adapt to changes in user presence and user interaction with a call session in multi-user scenarios.

While features and concepts of managing media content and call sessions in multi-display systems can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of managing media content and call sessions in multi-display systems can be implemented. The environment 100 includes a client device 102, a communication service 104, and a content service 106 that are interconnectable via network(s) 108. In this particular example, the client device 102 represents a mobile foldable device, such as a foldable smartphone, a foldable tablet device, a foldable laptop device, and so forth. Example attributes of the client device 102 are discussed below with reference to the device 900 of FIG. 9.

The client device 102 includes various functionality that enables the client device 102 to perform different aspects of managing media content and call sessions in multi-display systems discussed herein, including a mobile connectivity module 110, sensors 112, display devices 114, audio devices 116, applications 118, a recognition module 120, and a presenter module 122. The mobile connectivity module 110 represents functionality (e.g., logic and hardware) for enabling the client device 102 to interconnect with other devices and/or networks, such as the network 108. The mobile connectivity module 110, for instance, enables wireless and/or wired connectivity of the client device 102.

The sensors 112 are representative of functionality to detect various physical and/or logical phenomena in relation to the client device 102, such as motion, light, image detection and recognition, time and date, position, location, touch detection, sound, temperature, and so forth. Examples of the sensors 112 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In this particular example the sensors 112 include cameras 124, audio sensors 126, and an orientation sensor 128. The sensors 112, however, can include a variety of other sensor types in accordance with the implementations discussed herein.

The display devices 114 represent functionality for outputting visual content via the client device 102. As further detailed below, for instance, the client device 102 includes multiple display devices 114 that can be leveraged for outputting content. The audio devices 116 represent functionality for providing audio output for the client device 102. In at least one implementation the client device 102 includes audio devices 116 positioned at different regions of the client device 102, such as to provide for different audio output scenarios. The applications 118 represent functionality for performing different computing tasks via the client device 102, such as gaming, media consumption (e.g., content streaming), productivity tasks (e.g., word processing, content generation, data analysis, etc.), content generation, web browsing, communication with other devices, and so forth. In this particular example the applications 118 include a communication application 118a which represents functionality for enabling the client device 102 to engage in communication with other devices. The communication application 118a, for instance, represents a portal for interfacing with the communication service 104, such as for enabling communication (e.g., call sessions) between users of different devices.

The recognition module 120 represents functionality for recognizing objects detected by the sensors 112. For instance, utilizing video data captured by the cameras 124, the recognition module 120 can recognize visual objects present in the video data, such as a person. Various other types of sensor data may additionally or alternatively be used, such as audio data captured by the audio sensor 126. The presenter module 122 represents functionality for performing various aspects pertaining to managing media content and call sessions in multi-display systems in accordance with various implementations. For instance, and as further detailed below, the presenter module 122 is operable to configure and/or adapt presentation of media content and call sessions by the client device 102, such as based user position relative to the client device 102.

Figure 2A:
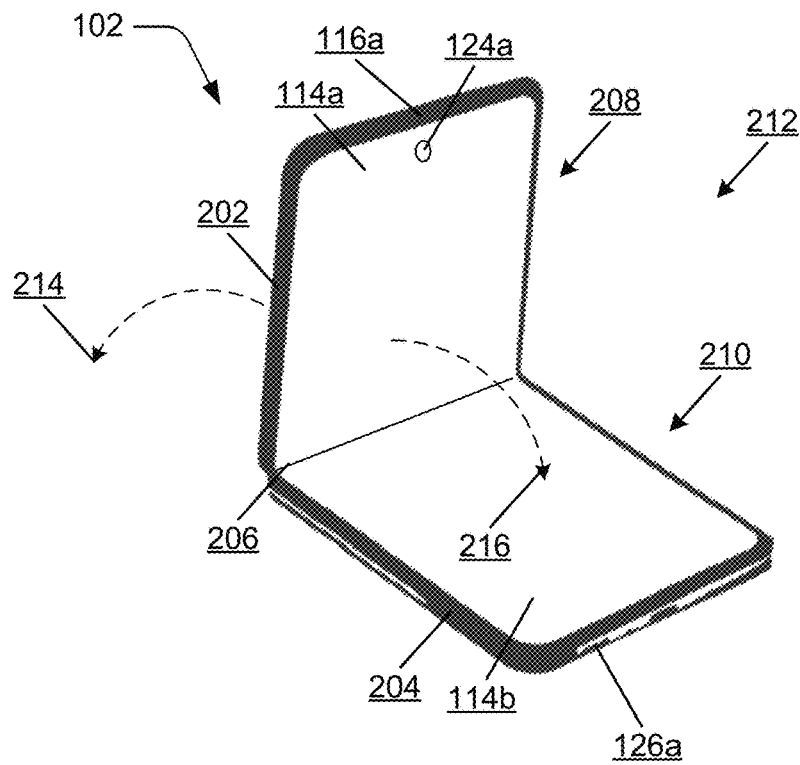
FIG. 2a illustrates features of the client device in accordance with one or more implementations.

FIG. 2a illustrates features of the client device 102 in accordance with one or more implementations. The view depicted in FIG. 2a, for instance, represents a front-facing view of the client device 102. The client device 102 includes a first housing 202 attached to a second housing 204 via a hinge region 206. The first housing 202 and/or the second housing 204, for instance, are pivotable about the hinge region 206 to assume a variety of different angular orientations relative to one another. The first housing 202 includes a display device 114a positioned on a front surface 208 of the first housing 202, and the second housing 204 includes a display device 114b positioned on a front surface 210 of the second housing 204. The client device 102 further includes a camera 124a positioned on the front surface 208 of the first housing 202. The camera 124a is positionable in various ways, such as within the perimeter of the display device 114a and/or underneath the display device 114a. Alternatively or additionally, the camera 124a is positionable adjacent the display device 114a.

In the depicted orientation the client device 102 is in a partially open position 212 with the first housing 202 pivoted away from the second housing 204. The first housing 202 is further pivotable about the hinge region 206 away from the second housing 204 to a fully open position 214. In the fully open position 214, for instance, the first housing 202 is substantially coplanar with the second housing 204. For example, in the fully open position 214 the display device 114a and the display device 114b are coplanar and form a single integrated display surface. The first housing 202 is also pivotable about the hinge region 206 to a closed position 216 where the display device 114a is positioned against the display device 114b. In at least one implementation the orientation sensor 128 is able to detect an orientation of the client device 102, e.g., based on an orientation of the first housing 202 relative to the second housing 204. The orientation sensor 128, for instance, can detect an angle of the first housing 202 relative to the second housing 204, and/or an amount of pivoting motion and/or rotation of the hinge region 206. Detecting the orientation of the client device 102 can be utilized for various purposes, such as for determining how to present media content and/or a call session on the client device 102.

Generally, the partially open position 212 enables different usage scenarios. For instance, in the partially open position 212 the second housing 204 can be placed on a surface such as a desk or a table to enable media content to be displayed on the display device 114a for user consumption. The client device 102 further includes audio devices 116a that provide audio output such as part of output of media content by the client device 102 and an audio sensor 126a that is operable to detect audible input, such speech input from a user of the client device 102. In at least one implementation the audio devices 116a are configured to output audio content correlated with video content output by the display device 114a.

Figure 2B:
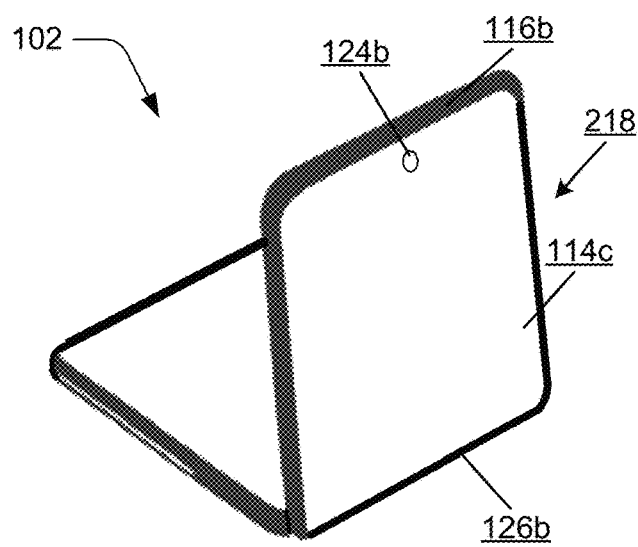
FIG. 2b illustrates further features of the client device in accordance with one or more implementations.

FIG. 2b illustrates further features of the client device 102 in accordance with one or more implementations. The view depicted in FIG. 2b, for instance, represents a rear-facing view of the client device 102, such as in the partially open position 212. In this view a rear surface 218 of the first housing 202 is illustrated, and the rear surface 218 includes a display device 114c. Further, the rear surface 218 includes a camera 124b positioned on the rear surface 218 of the first housing 202. The camera 124b is positionable in various ways, such as within the perimeter of the display device 114c and/or underneath the display device 114c. Alternatively or additionally, the camera 124b is positionable adjacent the display device 114c. The client device 102 further includes audio devices 116b and an audio sensor 126b. The audio devices 116b, for instance, provide audio output, such as part of output of media content by the client device 102 via the display device 114c. The audio sensor 126b is operable to detect audible input, such speech input from a user of the client device 102. In at least one implementation the audio devices 116b are configured to output audio content correlated with video content output by the display device 114c.

Having discussed an example environment and device in which the disclosed techniques can be performed, consider now some example scenarios and implementation details for implementing the disclosed techniques.

Figure 3A:
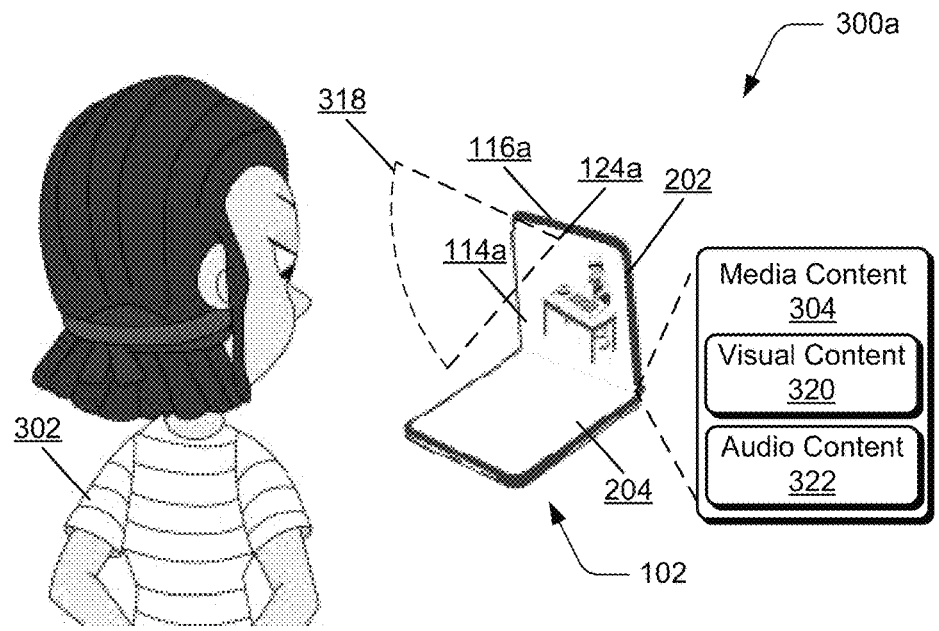
FIG. 3a depicts an example system for implementing aspects of managing media content and call sessions in multi-display systems in accordance with one or more implementations.
Figure 3A:
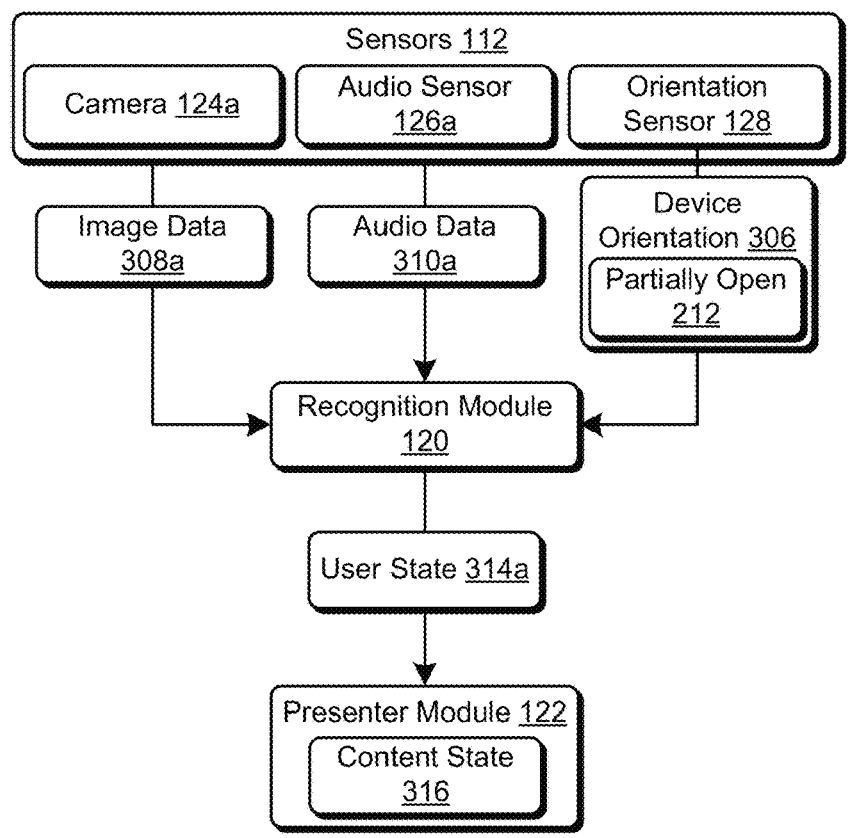

FIG. 3a depicts an example system 300a for implementing aspects of managing media content and call sessions in multi-display systems in accordance with one or more implementations. Generally, the system 300a can be implemented in the environment 100 and incorporates features and attributes of the environment 100 introduced above.

In the system 300a a user 302 is viewing media content 304 displayed on the display device 114a of the client device 102. Further, the sensors 112 capture various state information pertaining to the client device 102 and the user 302. For instance, the orientation sensor 128 determines a device orientation 306 of the client device 102, such as based on orientation and/or angle of the first housing 202 relative to the second housing 204. In this particular example the device orientation 306 indicates that the client device 102 is in the partially open position 212 described previously. In at least some implementations functionality of the client device 102 is controllable based on different device orientations. For instance, based on detecting that the client device 102 is in the partially open position 212, the presenter module 122 can perform dynamic switching of media content output, such as further described below.

Further to the system 300a the camera 124a captures image data 308a and the audio sensor 126a captures audio data 310a. The image data 308a, for instance, includes data describing visual objects in view of the camera 124a. Further, the audio data 310a includes data that describes detected audio, such as speech audio from the user 302.

Accordingly, the recognition module 120 receives the image data 308a and the audio data 310a and determines a user state 314a based on the received data. The recognition module 120, for instance, determines that the user 302 is in a position to view the media content 304 being presented on the display device 114a and/or is currently viewing the media content 304. The recognition module 120, for instance, implements facial recognition and/or gaze detection to determine that the user 302 is viewing the display device 114a. Alternatively or additionally, the recognition module 120 determines based on the audio data 310a that the user 302 is positioned such that the display device 114a is viewable. Thus, the user state 314a indicates that the user 302 is positioned to view the display device 114a.

Further to the system 300a, the presenter module 122 determines a content state 316 that indicates that the media content 304 is being output on the display device 114a. Further, the presenter module 122 receives the user state 314a and the device orientation 306. Thus, based on the content state 316, the user state 314a, and the device orientation 306, the presenter module 122 determines that the user 302 is positioned such that the media content 304 is viewable by the user on the display device 114a. The presenter module 122, for instance, determines that the user 302 is within a field of view 318 of the camera 124a such that the display device 114a is viewable by the user 302.

Further, as part of outputting the media content 304, visual content 320 is output via the display device 114a and audio content 322 is output via the audio devices 116a. In at least one implementation the audio devices 116a are positioned to direct the audio content 322 into a region extending from the front surface 208 of the first housing 202, such as to direct the audio content 322 toward a user that is viewing the display device 114a.

While the system 300a is discussed in the context of using the image data 308a and the audio data 310a to detect user position relative to the client device 102, at least some implementations are implementable to use a subset of this data. For instance, to determine the user state 314a the recognition module 120 can utilize the image data 308a alone, the audio data 310a alone, and/or a combination of any suitable type of sensor data.

According to various implementations the recognition module 120 receives image data 308a and/or audio data 310a in real time and dynamically updates the user state 314a. For instance, when the position of the user 302 changes relative to the client device 102 (e.g., based on movement of the user 302 and/or the client device 102), the recognition module 120 updates the user state 314a to identify the change in position of the user 302. When the user state 314a indicates that a position of the user 302 changes a threshold amount (e.g., to outside of the field of view 318) the presenter module 122 can perform various actions. For instance, based on determining that the position of the user 302 changes a threshold amount, the presenter module 122 performs an action to change output of the media content 304 to adapt to the change in position of the user 302.

Figure 3B:
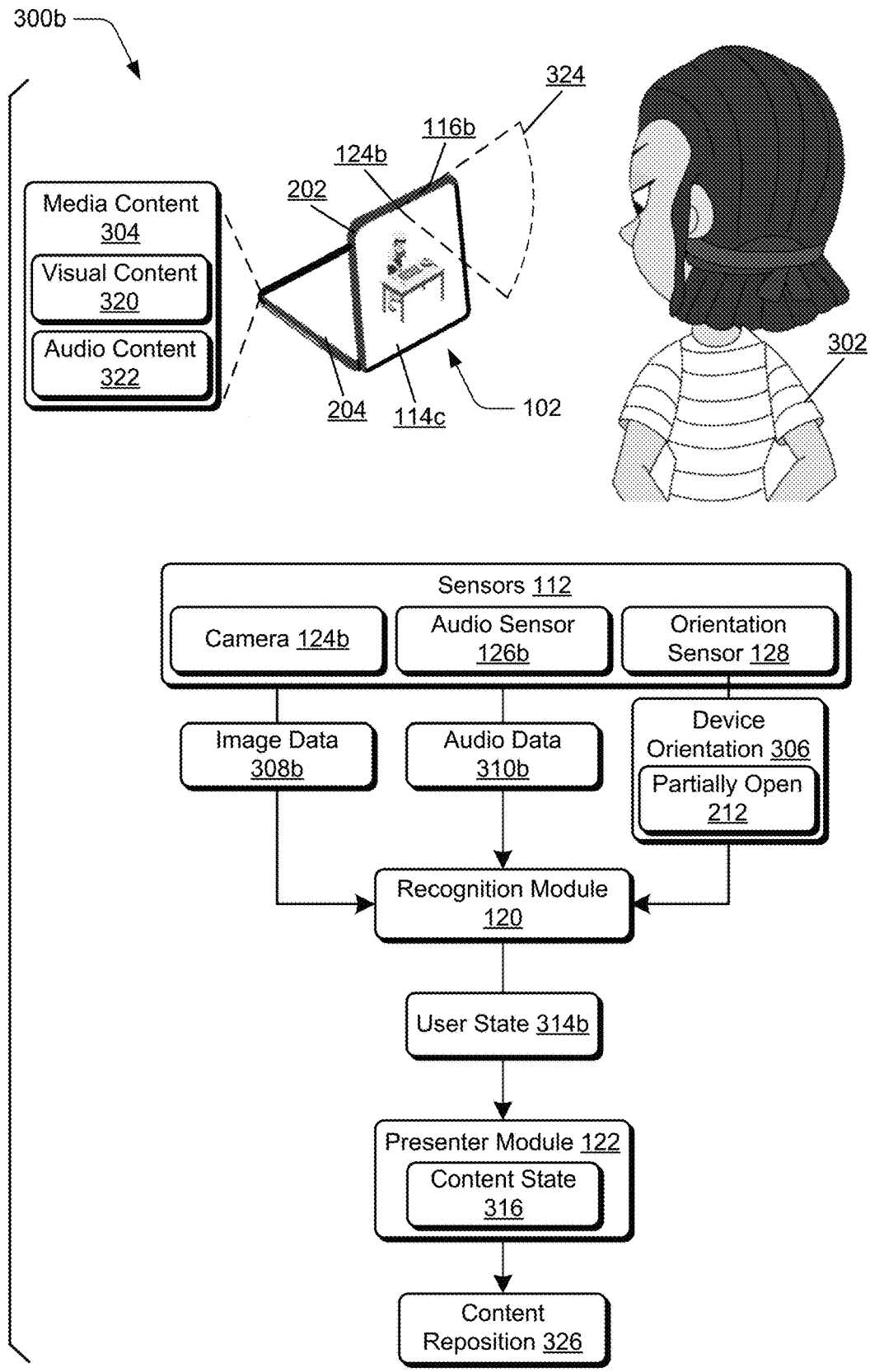
FIG. 3b depicts an example system for adapting output of media content based on a change in user position in accordance with one or more implementations.

FIG. 3b depicts an example system 300b for adapting output of media content based on a change in user position in accordance with one or more implementations. Generally, the system 300b can be implemented in the environment 100 and incorporates features and attributes of the environment 100 introduced above. The system 300b, for instance, represents a continuation of the system 300a.

In the system 300b the user 302 moves to a different position relative to the client device 102 and/or repositions the client device 102. The user 302, for instance, moves out of the field of view 318 of the camera 124a and moves into a field of view 324 of the camera 124b. In at least one implementation, in response to detecting that the user 302 moves out of the field of view 318, the presenter module 122 activates the camera 124b to determine if the user 302 is detected in the field of view 324.

Accordingly, with the user 302 repositioned relative to the client device 102, the sensors 112 continue capturing state information pertaining to the user 302 and the client device 102. For instance, the orientation sensor 128 determines the device orientation 306, e.g., that the client device 102 remains in the partially open position 212. Further, the camera 124b captures image data 308b and the audio sensor 126b captures audio data 310b. The recognition module 120 receives the image data 308b and the audio data 310b and determines a user state 314b based on the received data. The recognition module 120, for instance, determines that the user 302 is positioned such that the display device 114c is viewable, e.g., is within the field of view 324 of the camera 124b. As referenced above, the recognition module 120 can utilize a particular instance and/or combination of sensor data to determine user position such as the image data 308b, the audio data 310b, and/or any suitable combination of sensor data. Accordingly, the user state 314b indicates that the user 302 is positioned such that the display device 114c is viewable.

The presenter module 122 receives the user state 314b data and determines that the user 302 has moved and is now positioned such that the display device 114c is viewable. The presenter module 122 implements a content reposition 326 operation to move presentation of the media content 304 to the display device 114c of the client device 102. For instance, output of the visual content 320 is moved to the display device 114c, and output of the audio content 320 is moved to the audio devices 116b. In at least one implementation, in conjunction with the content reposition 326, output of the media content 304 on the display device 114a and the audio content on the audio devices 116a is stopped.

The implementations discussed in the systems 300a, 300b are dynamically operable to respond to changes in user position and to reposition content output accordingly. For instance, if the user 302 subsequently moves again and is positioned within the field of view 318 to view the display device 114a as depicted in the system 300a, the presenter module 122 can perform a further content reposition 326 to reposition output of the media content 304 onto the display device 114a and the audio devices 116a.

Figure 4A:
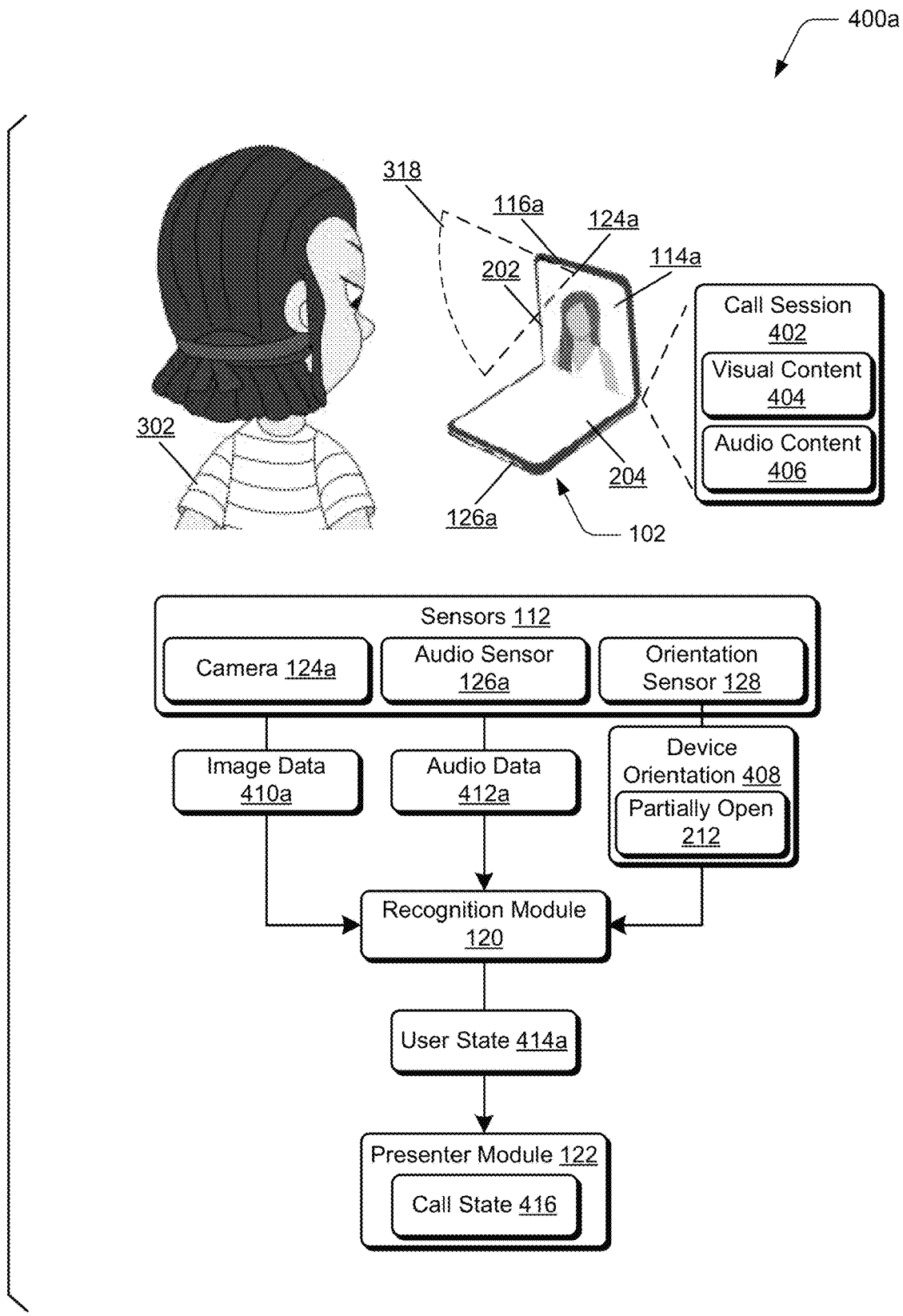
FIG. 4a depicts an example system for implementing aspects of managing media content and call sessions in multi-display systems in accordance with one or more implementations.

FIG. 4a depicts an example system 400a for implementing aspects of managing media content and call sessions in multi-display systems in accordance with one or more implementations. The system 400a can be implemented in the environment 100 and incorporates features and attributes of the environment 100 introduced above.

In the system 400a the user 302 is participating in a call session 402 via the client device 102. The call session 402, for instance, represents a video call implemented via the communication application 118a and the communication service 104. The call session 402 includes visual content 404 output via the display device 114a and audio content 406 output via an audio device 116a. The visual content 404 and the audio content 406, for instance, include visual and audio content received from a remote device and represent a remote user of the remote device. Further, the visual content 404 and the audio content 406 include visual and audio content captured at the client device 102 and transmitted to the remote device.

In the system 400a the sensors 112 capture various state information pertaining to the client device 102 and the user 302. For instance, the orientation sensor 128 determines a device orientation 408 of the client device 102, such as based on orientation and/or angle of the first housing 202 relative to the second housing 204. In this particular example the device orientation 408 indicates that the client device 102 is in the partially open position 212 described previously.

Further, the camera 124a captures image data 410a and the audio sensor 126 captures audio data 412a. The image data 410a, for instance, includes data describing visual objects in view of the camera 124a. The audio data 412a includes data that describes detected audio, such as speech audio from the user 302. The image data 410a and the audio data 412a are included in the visual content 404 and the audio content 406, respectively, such as for transmission to a remote device participating in the call session 402. Accordingly, the recognition module 120 receives the image data 410a and the audio data 412a and determines a user state 414a based on the received data. The recognition module 120, for instance, determines that the user 302 is in a position to view the call session 402 being presented on the display device 114a and/or is currently viewing the call session 402. In at least one implementation the recognition module 120 implements facial recognition and/or gaze detection to determine that the user 302 is viewing the display device 114a. Alternatively or additionally, the recognition module 120 determines based on the audio data 412a that the user 302 is positioned such that the display device 114a is viewable. Thus, the user state 414a indicates that the user 302 is positioned to view the display device 114a.

Further to the system 400a, the presenter module 122 determines a call state 416 that indicates that the call session 402 is being output on the display device 114a and the audio device 116a. The presenter module 122 receives the user state 414a and the device orientation 408 and based on the call state 416, the user state 414a, and the device orientation 408, the presenter module 122 determines that the user 302 is positioned such that the call session 402 is viewable by the user on the display device 114a. The presenter module 122, for instance, determines that the user 302 is within the field of view 318 of the camera 124a such that the display device 114a is viewable by the user 302.

According to various implementations the recognition module 120 receives image data 410a and/or audio data 412a in real time and dynamically updates the user state 414a. For instance, when the position of the user 302 changes relative to the client device 102 (e.g., based on movement of the user 302 and/or the client device 102), the recognition module 120 updates the user state 414a to identify the change in position of the user 302. When the user state 414a indicates that a position of the user 302 changes a threshold amount (e.g., to outside of the field of view 318) the presenter module 122 can perform various actions. For instance, based on determining that the position of the user 302 changes a threshold amount, the presenter module 122 performs an action to change output of the call session 402 to adapt to the change in position of the user 302.

Figure 4B:
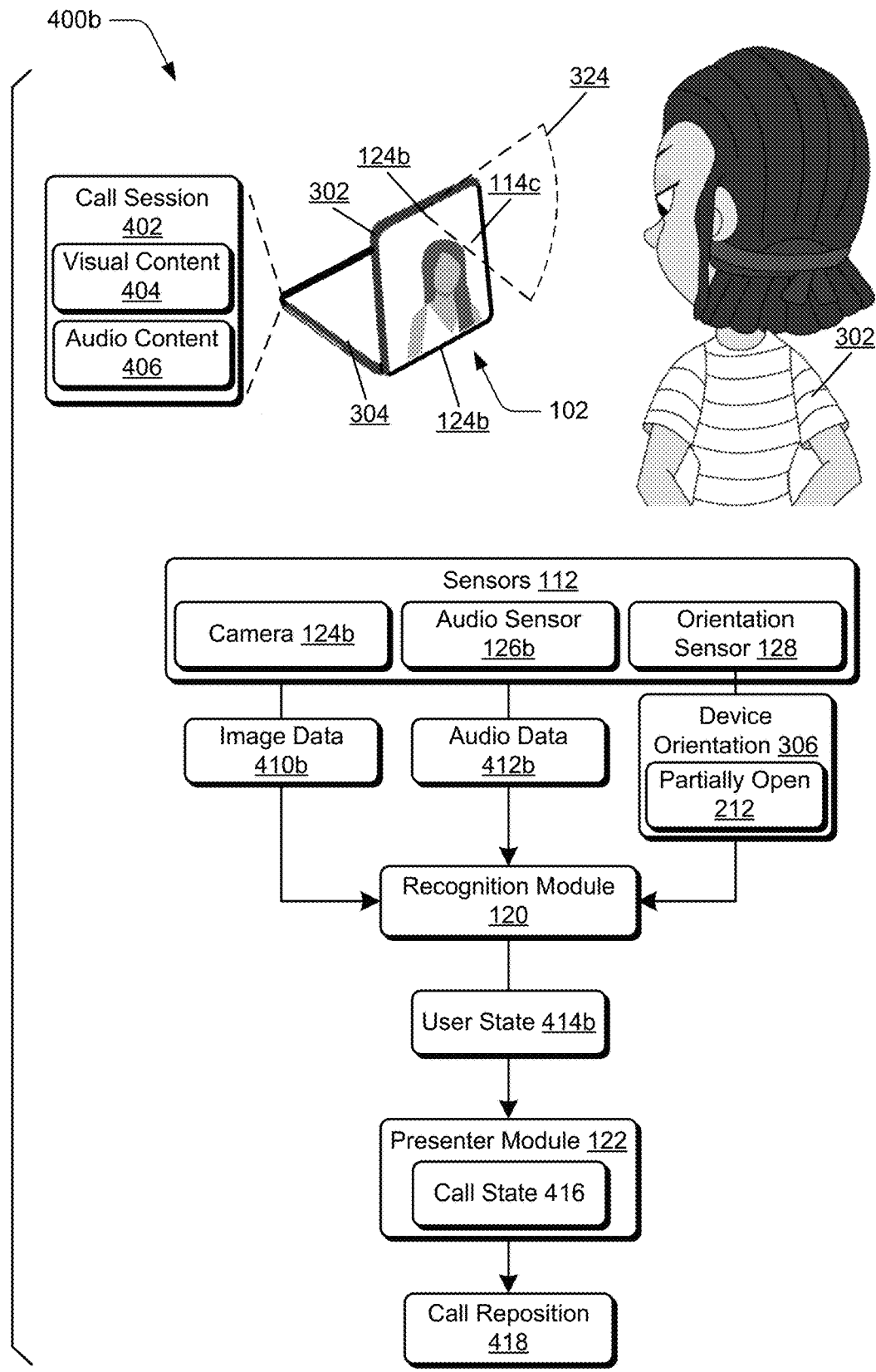
FIG. 4b depicts an example system for adapting output of a call session based on a change in user position in accordance with one or more implementations.

FIG. 4b depicts an example system 400b for adapting output of a call session based on a change in user position in accordance with one or more implementations. The system 400b can be implemented in the environment 100 and incorporates features and attributes of the environment 100 introduced above. The system 400b, for instance, represents a continuation of the system 400a.

In the system 400b the user 302 moves to a different position relative to the client device 102 and/or repositions the client device 102 while the call session 402 is in progress. The user 302, for instance, moves out of the field of view 318 of the camera 124a and moves into a field of view 324 of the camera 124b. In at least one implementation, in response to detecting that the user 302 moves out of the field of view 318, the presenter module 122 activates the camera 124b to determine if the user 302 is detected in the field of view 324.

Accordingly, with the user 302 repositioned relative to the client device 102, the sensors 112 continue capturing state information pertaining to the user 302 and the client device 102. For instance, the orientation sensor 128 determines the device orientation 408, e.g., that the client device 102 remains in the partially open position 212. Further, the camera 124b captures image data 410b and the audio sensor 126 captures audio data 412b. The recognition module 120 receives the image data 410b and the audio data 412b and determines a user state 414b based on the received data. The recognition module 120, for instance, determines that the user 302 is positioned such that the display device 114c is viewable, e.g., is within the field of view 324 of the camera 124b. As referenced above, the recognition module 120 can utilize a particular instance and/or combination of sensor data to determine user position such as the image data 410b, the audio data 412b, and/or any suitable combination of sensor data. Accordingly, the user state 414b indicates that the user 302 is positioned such that the display device 114c is viewable.

The presenter module 122 receives the user state 414b data and determines that the user 302 has moved and is now positioned such that the display device 114c is viewable. Accordingly, based on the call state 416 indicating that the call session 402 is in progress and the user state 414b, the presenter module 122 implements a call reposition 418 operation to move presentation of the call session 402 to the display device 114c of the client device 102. For instance, output of the visual content 404 is moved to the display device 114c, and output of the audio content 406 is moved to the audio devices 116b. In at least one implementation, in conjunction with the call reposition 418, output of the visual content 404 on the display device 114a and the audio content 406 on the audio devices 116a is stopped.

The implementations discussed in the systems 400a, 400b are dynamically operable to respond to changes in user position and to reposition content output accordingly. For instance, if the user 302 subsequently moves again and is positioned within the field of view 318 to view the display device 114a as depicted in the system 400a, the presenter module 122 can perform a further call reposition 418 to reposition output of the visual content 404 onto the display device 114a and the audio content 406 onto the audio devices 116a.

FIG. 4c depicts an example system 400c for adapting a call session for different users in accordance with one or more implementations. The system 400c can be implemented in the environment 100 and incorporates features and attributes of the environment 100 introduced above. The system 400c, for instance, represents a continuation of the systems 400a, 400b.

In the system 400c the call session 402 is in progress on the client device 102. Further, the user 302 is positioned within the field of view 318 of the camera 124a and a user 420 is positioned within the field of view 324 of the camera 124b. The cameras 124a, 124b capture image data 410c and the audio sensors 126a, 126b capture audio data 412c. The recognition module 120 receives the image data 410c and the audio data 412c and generates user state 414c data. The user state 414c indicates that the user 302 is detected as being positioned to view the display device 114a (e.g., within the field of view 318) and the user 420 is positioned to view the display device 114c, e.g., within the field of view 324. Thus, based on the user state 414c indicating that the users 302, 420 are positioned to view the respective display devices 114a, 114c, the presenter module 122 causes the call session 402 to be output via both of the display devices 114a, 114c and the audio devices 116a, 116b. The user state 414c also indicates that the user 420 is interacting with the call session 402. The audio data 412c, for instance, indicates voice input from the user 420. Alternatively or additionally, the image data 410c indicates that the user 420 is talking, e.g., based on mouth movement detected from the user 420.

Accordingly, based on the user state 414c indicating audio input from the user 420, the presenter module 122 performs a focus reposition 422 that focuses on voice input from the user 420. For instance, the user state 414c indicates that speech input to the call session 402 switches from the user 302 to the user 420. Since the location of the user 420 is known based on the image data 410c and the audio data 412c, the presenter module 122 causes the audio content 406 to focus on speech input received from the user 420. In at least one implementation the presenter module 122 implements and/or causes to be implemented audio beamforming that focuses on speech input from the user 420 detected in the audio data 412*c* for inclusion in the audio content 406. Further, the presenter module 122 can apply a visual enhancement to an image of the user 420 obtained from the image data 410*c* for inclusion in the visual content 404, such as to provide a visual indication that the user 420 is speaking.

The system 400*c* is implementable to perform multiple focus repositions 422 to dynamically adapt to changes in user interaction with the call session 402. For instance, as the audio data 412*c* indicates that speech input switches between the users 302, 420, the user state 414*c* indicates changes in which user 302, 420 is currently speaking and thus focus repositions 422 are performed to focus the audio content 406 on which of the users 302, 420 are speaking.

While implementations are discussed herein with reference to the client device 102 in the partially open position 212, it is to be appreciated that the described techniques can be applied with the client device 102 in a variety of different orientations. For instance, the client device can be opened to the fully open position 214 such that the device is in a planar or semi-planar orientation, and placed on a dock or other device holding apparatus in a vertical orientation such that the display device 114*a* and the display device 114*c* are viewable from different respective orientations. In this orientation the techniques described herein can be applied such as for managing media content and/or call sessions.

Figure 5:
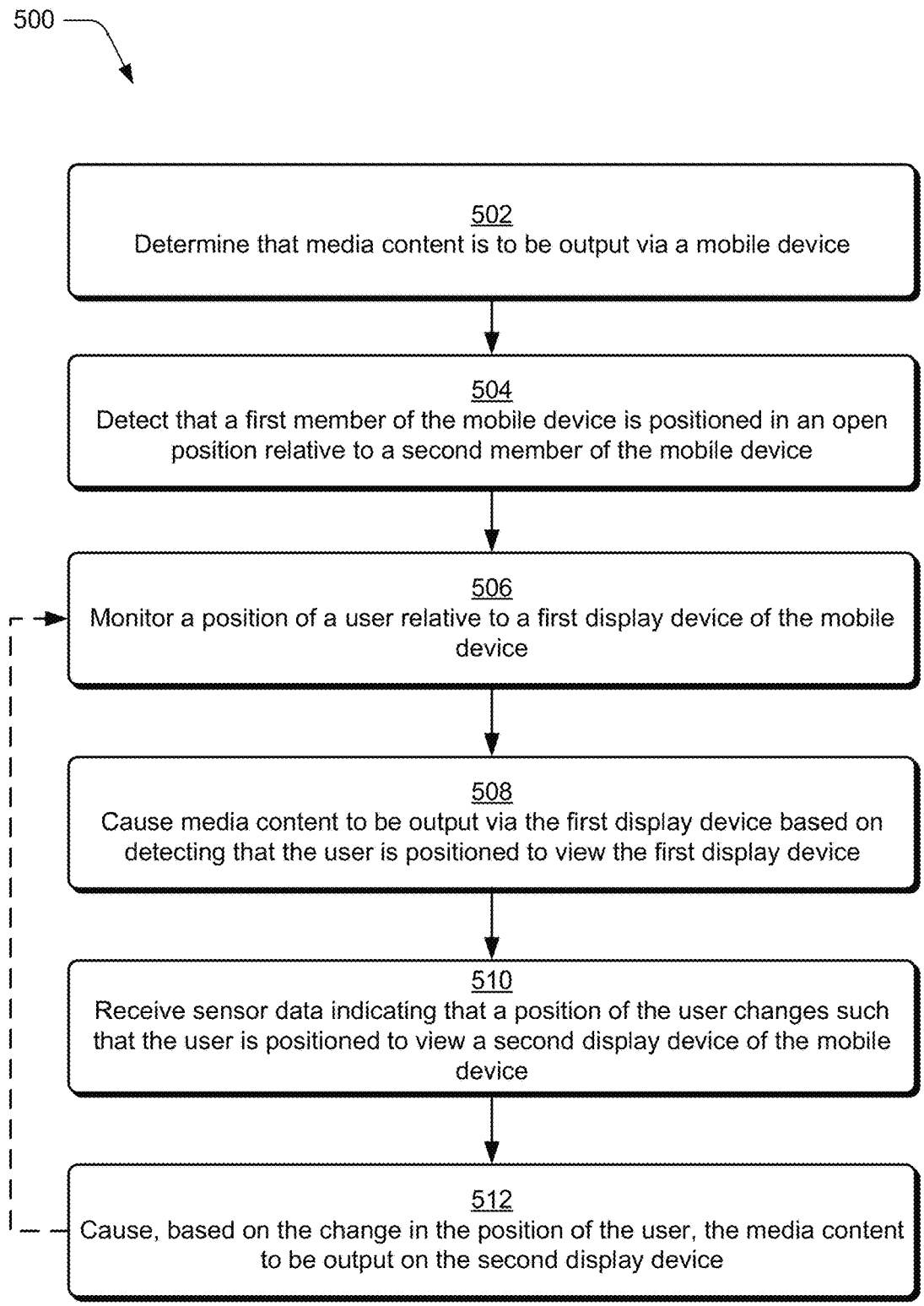
FIG. 5 illustrates a flow chart depicting an example method for managing media content in multi-display systems in accordance with one or more implementations.

FIG. 5 illustrates a flow chart depicting an example method 500 for managing media content in multi-display systems in accordance with one or more implementations. At 502 it is determined that media content is to be output via a client device. The presenter module 122, for instance, determines that a user performs an action to indicate that media content is to be output via the client device 102. The media content, for instance, includes digital visual content and optionally, digital audio content.

At 504 it is detected that a first housing of the client device is positioned in an open position relative to a second housing of the client device. For example, the presenter module 122 determines that the client device 102 is positioned in the partially open position 212. Generally, orientation of the client device 102 can be determined in various ways, such as based on an angle of the first housing 202 relative to the second housing 204, a rotational orientation of the hinge region 206, based on a spatial position of the first housing 202 and/or the second housing 204, and/or combinations thereof.

At 506 a position of a user relative to a first display device of the client device is monitored. The recognition module 120, for example, receives image data from a camera 124 and/or audio data from an audio sensor 126 and determines a user position relative to a display device 114 of the client device 102, such as the display device 114*a* and/or the display device 114*c*. At 508 media content is caused to be output via the first display device based on detecting that the user is positioned to view the first display device. The presenter module 122, for example, determines that a user is positioned to view the display device 114*a*, such as based on user state data received from the recognition module 120.

At 510 sensor data is received indicating that a position of the user changes such that the user is positioned to view a second display device of the client device. The recognition module 120, for example, receives sensor data from the sensors 112 indicating that the user is repositioned relative to the client device 102, such as based on image data received from a camera 124 and/or audio data received from an audio sensor 126. In at least one implementation the recognition module 120 generates updated user state data that indicates the change in user position.

At 512, based on the change in the position of the user, the media content is caused to be output on the second display device. The presenter module 122, for example, receives an indication of the change in user position such that the second display device is viewable by the user (e.g., based on updated user state data) and causes the media content to be output via the second display device. Further, where the media content includes audio content, output of the audio content is switchable to an audio device 116 that is positioned to output audio content related to visual content output by the second display device. In at least one implementation, based on outputting the media content via the second display device, output of the media content via the first display device is paused and/or stopped.

The method 500 is performable in real-time to respond dynamically to changes in user position over time. For instance, if the user is repositioned again relative to the client device 102 such that the first display device is detected as being viewable by the user, output of the media content is switchable to the first display device and optionally, output of the media content via the second display device is paused and/or stopped.

Figure 6:
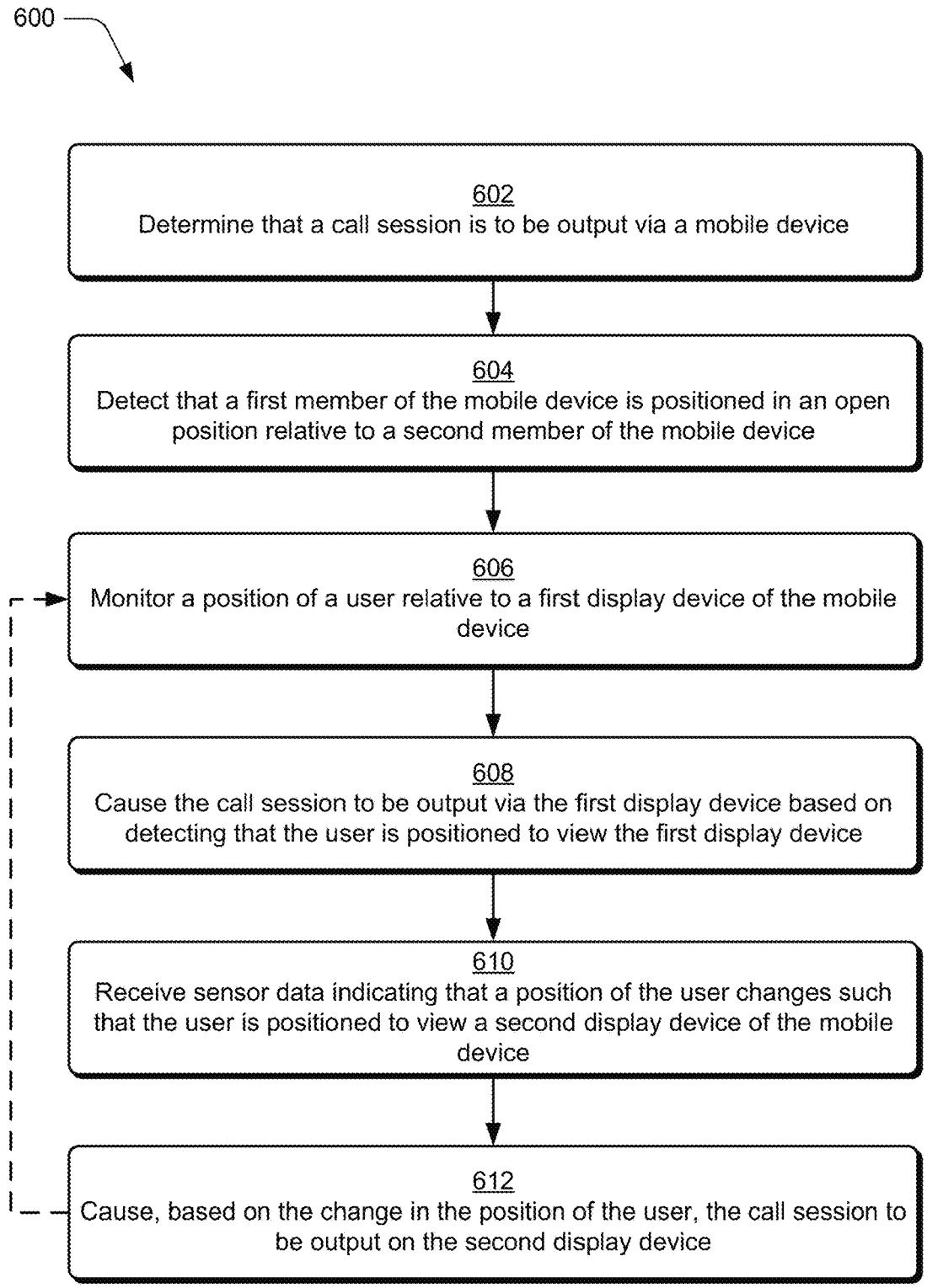
FIG. 6 illustrates a flow chart depicting an example method for managing call sessions in multi-display systems in accordance with one or more implementations.

FIG. 6 illustrates a flow chart depicting an example method 600 for managing call sessions in multi-display systems in accordance with one or more implementations. At 602 it is determined that a call session is to be output via a client device. The presenter module 122, for instance, determines that a user performs an action to indicate that call session is to be output via the client device 102. The user, for example, invokes the communication application 118*a* to initiate a call session and/or to join a call session.

At 604 it is detected that a first housing of the client device is positioned in an open position relative to a second housing of the client device. For example, the presenter module 122 determines that the client device 102 is positioned in the partially open position 212. Generally, orientation of the client device 102 can be determined in various ways, examples of which are discussed above.

At 606 a position of a user relative to a first display device of the client device is monitored. The recognition module 120, for example, receives image data from a camera 124 and/or audio data from an audio sensor 126 and determines a user position relative to a display device 114 of the client device 102, such as the display device 114*a* and/or the display device 114*c*. At 608 the call session is caused to be output via the first display device based on detecting that the user is positioned to view the first display device. The presenter module 122, for example, determines that a user is positioned to view the display device 114*a*, such as based on user state data received from the recognition module 120.

At 610 sensor data is received indicating that a position of the user changes such that the user is positioned to view a second display device of the client device. The recognition module 120, for example, receives sensor data while the call session is active from the sensors 112 indicating that the user is repositioned relative to the client device 102, such as based on image data received from a camera 124 and/or audio data received from an audio sensor 126. In at least one implementation the recognition module 120 generates updated user state data that indicates the change in user position.

At 612, based on the change in the position of the user, the call session is caused to be output on the second display device. The presenter module 122, for example, receives an indication of the change in user position such that the second display device is viewable by the user (e.g., based on updated user state data) and causes the call session to be output via the second display device. In at least one implementation, output of audio content of the call session is switchable to an audio device 116 that is positioned to output audio content related to visual content output by the second display device. In at least one implementation, based on outputting the call session via the second display device, output of the call session via the first display device is paused and/or stopped.

The method 600 is performable in real-time to respond dynamically to changes in user position over time. For instance, if the user is repositioned again relative to the client device 102 such that the first display device is detected as being viewable by the user, output of the call session is switchable to the first display device and optionally, output of the call session via the second display device is paused and/or stopped.

Figure 7:
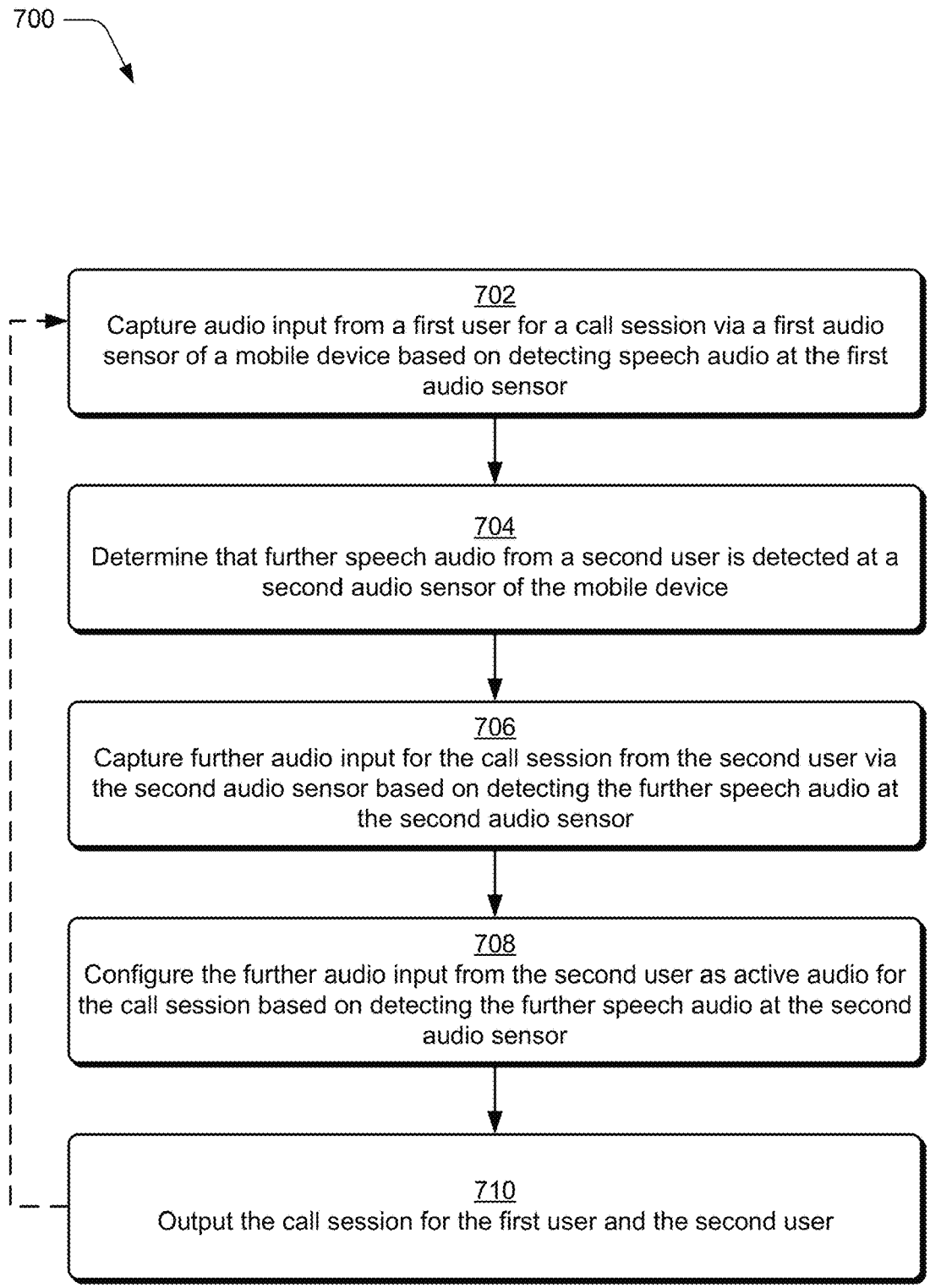
FIG. 7 illustrates a flow chart depicting an example method for identifying primary audio input for a call session in accordance with one or more implementations.

FIG. 7 illustrates a flow chart depicting an example method 700 for identifying primary audio input for a call session in accordance with one or more implementations. In at least one implementation the method 700 is performable in conjunction with the method 600, such as dynamically during a call session. At 702 audio input from a first user for a call session is caused to be captured via a first audio sensor of a client device based on detecting speech audio at the first audio sensor. For instance, the recognition module 120 receives audio data indicating the speech audio is detected as being directed toward the audio sensor 126a at the first surface 208 of the first housing 202 of the client device 102. In at least one implementation the recognition module 120 utilizes audio beamforming to identify a direction of the speech audio relative to the first surface 208. The presenter module 122 utilizes the audio input to generate audio content for the call session, such as for transmission to a remote device participating in the call session. In at least one implementation the detected speech audio originates from a first user that is participating in the call session.

Further, video data is captured of the first user that generates the speech audio and is utilized to generate video content for the call session, such as for transmission to the remote device. The camera 124a at the first surface 208, for example, captures an image of the user and generates video content that includes the image of the user, such as a live image of the user while the user is speaking. In conjunction with capturing the video and audio content of the first user, video and audio content of the call session is output for the first user at a first display device (e.g., the display device 114a) and a first audio device, e.g., the audio device 116a.

At 704 it is determined that further speech audio from a second user is detected at a second audio sensor of the client device. For instance, the recognition module 120 receives audio data indicating the speech audio is detected as being directed toward the audio sensor 126b at the second surface 210 of the first housing 202 of the client device 102. In at least one implementation the recognition module 120 utilizes audio beamforming to identify a direction of the speech audio relative to the second surface 210. Alternatively or additionally video data from a camera 124 (e.g., the camera 124b) is captured that identifies the presence of a user that is positioned at the second surface 210 of the first housing of the client device 102. The user, for instance, represents a second user that is present in proximity to the client device 102 concurrently with the first user.

At 706 further audio input for the call session from the second user is captured via the second audio sensor based on detecting the further speech audio at the second audio sensor. The presenter module 122, for instance, utilizes the further audio input to generate audio content for the communication session. At 708 the further audio input from the second user is configured as active audio for the call session based on detecting the further speech audio at the second audio sensor. For instance, the presenter module 122 prioritizes the further audio input over audio input received at the first audio sensor, such as to audibly emphasize speech input received at the second audio sensor. As mentioned above, for example, audio beamforming can be utilized to focus on audio received from a user that provides the further speech audio. For instance, audio beamforming can be utilized to filter out audible sounds (e.g., noise) that does not originate from the user that provides the further speech audio.

Further, video data of the second user that that provides the further speech audio is captured and utilized as video content for the call session. In at least one implementation the second user that provides the further speech is visually identified in the video content as an active user, e.g., a user that currently has focus in the call session.

At 710 the call session is output for the first user and the second user. For instance, video content and audio content of the call session are output (e.g., simultaneously) via the display devices 114a, 114c and the audio devices 116a, 116b, such as to enable the first user and the second user to simultaneously view and interact with the call session. In at least one implementation, if the first user and/or the second user are detected as moving out of view of a particular display device 114 and/or camera 124, output of the call session via a respective display device can be paused and/or stopped.

The method 700 is performable in real-time to respond dynamically to changes in detected speech input over time. For instance, as users participating in the call session via the client device 102 alternate between providing speech input detected by the different audio sensors, audio focus is applied to the speech input from the respective users for generating audio content for the call session.

Figure 8:
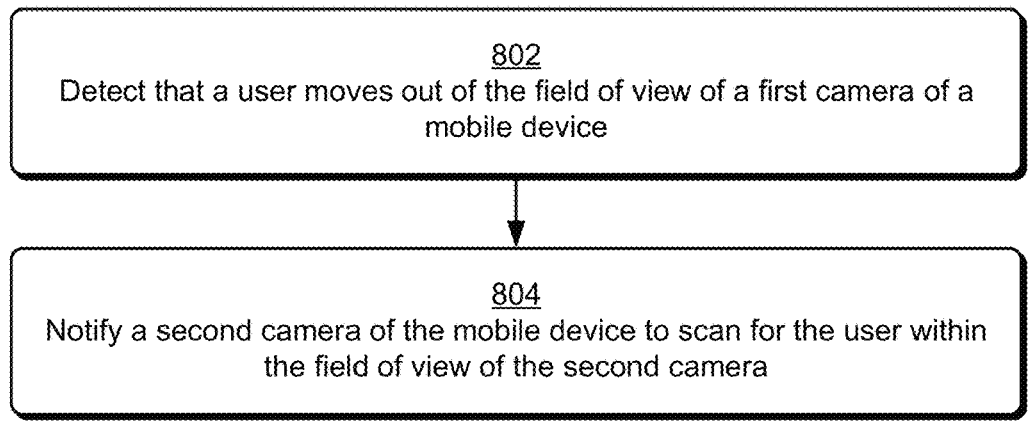
FIG. 8 illustrates a flow chart depicting an example method for enabling a user to be detected via a camera in accordance with one or more implementations.

FIG. 8 illustrates a flow chart depicting an example method 800 for enabling a user to be detected via a camera in accordance with one or more implementations. The method 800, for instance, is implemented in conjunction with the method 500 and/or the method 600 to enable user repositioning relative to a client device to be detected.

At 802 it is detected that a user moves out of the field of view of a first camera of a client device. The presenter module 122, for instance, receives user state data from the recognition module 120 indicating that a user moves out of the field of view of the camera 124a. For example, the user was previously detected as being positioned to view the display device 114a and then moves out of a field of view of the camera 124a. The user can be detected as moving out of the field of view of the first camera while media content is being output on the client device, and/or while a call session is in progress on the client device.

At 804 a second camera of the client device is notified to scan for the user within the field of view of the second camera. For example, the presenter module 122 notifies the camera 124b to scan for an image of the user in a field of view of the camera 124b. In an implementation where image data from the camera 124b indicates that the user is detected such that the display device 114c is viewable by the user, output of media content and/or a call session can be switched to the display device 114c, such as described above. In at least one implementation this enables the camera 124b to be maintained in a low power mode and/or a power off mode until the camera 124b is notified to scan for an image of the user.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 9:
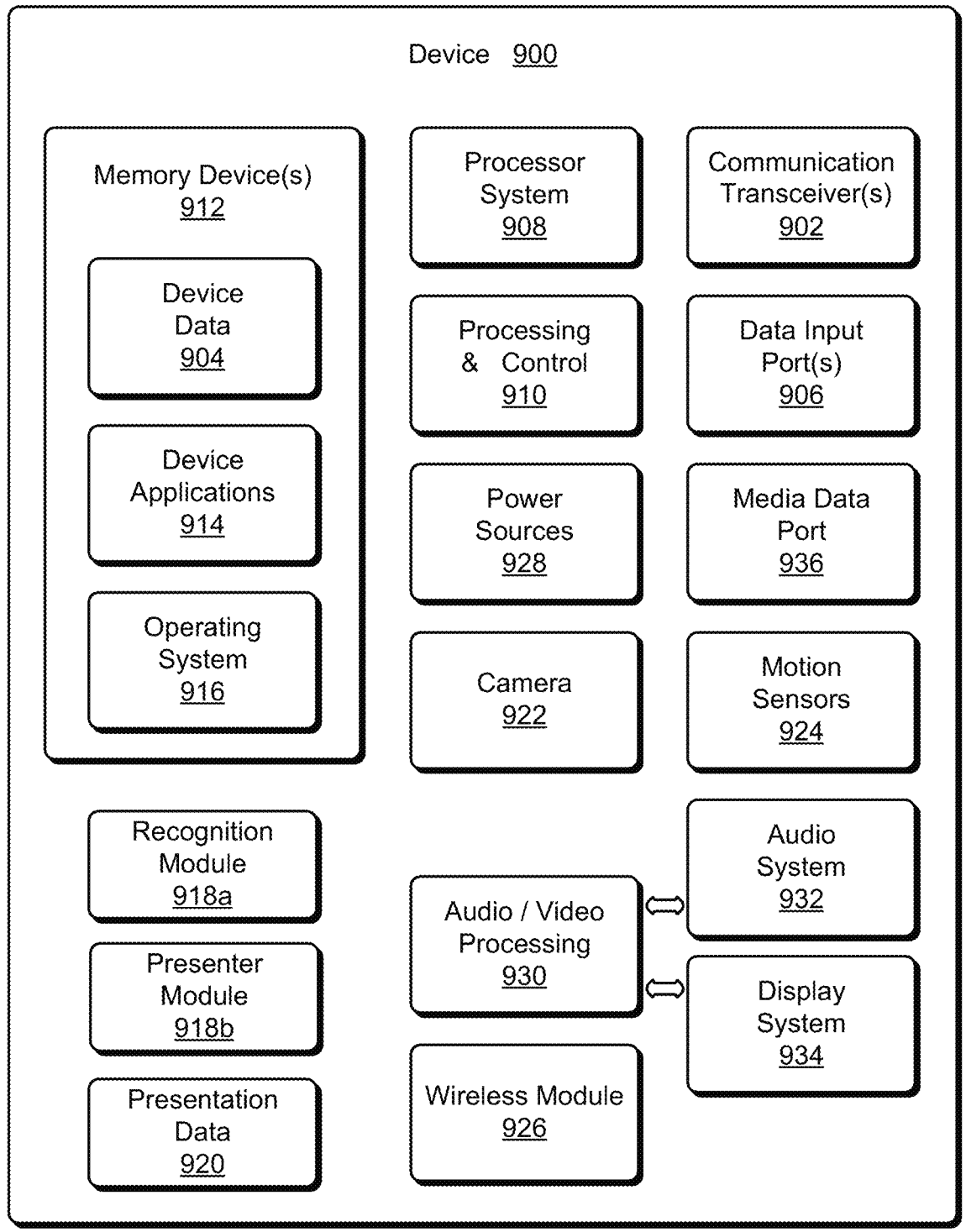
FIG. 9 illustrates various components of an example device in which aspects of managing media content and call sessions in multi-display systems can be implemented.

FIG. 9 illustrates various components of an example device 900 in which aspects of managing media content and call sessions in multi-display systems can be implemented. The example device 900 can be implemented as any of the devices described with reference to the previous FIGS. 1-8, such as any type of client device, mobile phone, mobile device, wearable device, tablet, computing, communication, entertainment, gaming, media playback, and/or other type of electronic device. For example, the client device 102 as shown and described with reference to FIGS. 1-9 may be implemented as the example device 900.

The device 900 includes communication transceivers 902 that enable wired and/or wireless communication of device data 904 with other devices. The device data 904 can include any of device identifying data, device location data, wireless connectivity data, and wireless protocol data. Additionally, the device data 904 can include any type of audio, video, and/or image data. Example communication transceivers 902 include wireless personal area network (WPAN) radios compliant with various IEEE 902.15 (Bluetooth™) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a recognition module 918a and a presenter module 918b that implement aspects of managing media content and call sessions in multi-display systems and may be implemented with hardware components and/or in software as one of the device applications 914. For example, the recognition module 918a can be implemented as the recognition module 120 and the presenter module 918b can be implemented as the presenter module 122, described in detail above. In implementations, the recognition module 918a and/or the presenter module 918b may include independent processing, memory, and logic components as a computing and/or electronic device integrated with the device 900. The device 900 also includes presentation data 920 for implementing aspects of managing media content and call sessions in multi-display systems and may include data from the recognition module 918a and/or the presenter module 918b.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. For instance, for the client device 102, the wireless module 926 can be leveraged to scan for and detect wireless networks, as well as negotiate wireless connectivity to wireless networks for the client device 102. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of managing media content and call sessions in multi-display systems have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a client device including: a first housing foldably attached to a second housing via a hinge; a first display device positioned at a first surface of the first housing and a second display device positioned at a second surface of the first housing; a sensor system including one or more sensors; and one or more modules implemented at least in part in hardware of the client device to: cause media content to be output via the first display device based on detecting that a user is positioned to view the first display device; receive sensor data from the sensor system indicating that a position of the user changes such that the user is positioned to view the second display device; and cause, based on the change in the position of the user, the media content to be output on the second display device.

In some aspects, the techniques described herein relate to a client device, wherein the sensor data further includes an indication that the client device is in an open position based on a position of the first housing relative to the second housing.

In some aspects, the techniques described herein relate to a client device, wherein the indication that the client device is in an open position is based at least in part on detecting a position of the hinge relative to one or more of the first housing or the second housing.

In some aspects, the techniques described herein relate to a client device, wherein the one or more modules are further implemented to output the media content via a first audio device based on detecting that the user is positioned to view the first display device, and to switch output of the media content to a second audio device based on the change in the position of the user.

In some aspects, the techniques described herein relate to a client device, wherein the one or more modules are further implemented to stop output of the media content via the first display device based on the change in the position of the user.

In some aspects, the techniques described herein relate to a client device, wherein the sensor data includes image data indicating that the user data is detected within a field of view of a camera positioned at the second surface of the first housing of the client device.

In some aspects, the techniques described herein relate to a client device, wherein the sensor data includes audio data indicating that speech content from the user is detected at the second surface of the first housing of the client device.

In some aspects, the techniques described herein relate to a client device, wherein the detecting that the user is positioned to view the first display device is based at least in part on detecting the user within a field of view of a first camera positioned at the first surface of the first housing of the client device, and wherein the one or more modules are further implemented to: detect that the user moves out of the field of view of the first camera; and notify a second camera positioned at the second surface of the first housing to scan for an image of the user.

In some aspects, the techniques described herein relate to a system including: one or more processors; and one or more computer-readable storage media storing instructions that are executable by the one or more processors to: detect that a first housing of a client device is positioned in an open position relative to a second housing of the client device; cause media content to be output via a first display device positioned at a first surface of the first housing based on detecting that a user is positioned to view the first display device; receive sensor data from a sensor system indicating that a position of the user changes such that the user is positioned to view a second display device positioned at a second surface of the first housing of the client device; and cause, based on the change in the position of the user, the media content to be output on the second display device.

In some aspects, the techniques described herein relate to a system, wherein to detect that the first housing of the client device is positioned in an open position relative to the second housing of the client device is based on detecting an orientation of a hinge that connects the first housing to the second housing.

In some aspects, the techniques described herein relate to a system, wherein to cause the media content to be output via the first display device is based on to detect an image of the user within a field of view of a first camera positioned at the first surface of the first housing of the client device, and wherein the sensor data from the sensor system indicating that a position of a user changes such that the user is positioned to view a second display includes an indication that an image of the user is detected within a field of view of a second camera positioned at the second surface of the first housing of the client device.

In some aspects, the techniques described herein relate to a system, wherein to cause the media content to be output via the first display device is based on to detect speech content from the user adjacent the first surface of the first housing of the client device, and wherein the sensor data from the sensor system indicating that a position of a user changes such that the user is positioned to view a second display includes detecting speech content from the user adjacent the second surface of the first housing of the client device.

In some aspects, the techniques described herein relate to a system, wherein detecting that the user is positioned to view the first display device is based at least in part on detecting the user within a field of view of a first camera positioned at the first surface of the first housing of the client device, and wherein the instructions are further executable by the one or more processors to: detect that the user moves out of the field of view of the first camera; and notify a second camera positioned at the second surface of the first housing to scan for an image of the user.

In some aspects, the techniques described herein relate to a system, and wherein the instructions are further executable by the one or more processors to stop output of the media content on the first display device in response to output of the media content on the second display device.

In some aspects, the techniques described herein relate to a system, wherein the instructions are further executable by the one or more processors to output the media content via a first audio device based on detecting that the user is positioned to view the first display device, and to switch output of the media content to a second audio device based on the change in the position of the user.

In some aspects, the techniques described herein relate to a system, wherein the instructions are further executable by the one or more processors to: receive further sensor data from the sensor system indicating that the position of a user further changes such that the user is positioned to view the first display device; and cause, based on the further change in the position of the user, the media content to be output on the first display device; and cause output of the media content via the second display device to stop.

In some aspects, the techniques described herein relate to a method, including: monitoring a position of a user relative to a first display device of a client device; causing media content to be output via the first display device based on detecting that the user is positioned to view the first display device; receiving sensor data from a sensor system indicating that a position of the user changes such that the user is positioned to view a second display device of the client device; and causing, based on the change in the position of the user, the media content to be output on the second display device.

In some aspects, the techniques described herein relate to a method, wherein the client device includes a first housing attached to a second housing via a hinge, the first display device is positioned at a first surface of the first housing, the second display device is positioned at a second surface of the first housing, and wherein the monitoring the position of the user relative to the first display device is based at least in part on: determining that the client device is in an open position based on a position of the first housing relative to the second housing; and determining that the media content is to be output via the client device.

In some aspects, the techniques described herein relate to a method, wherein detecting that the user is positioned to view the first display device is based on detecting the user within a field of view of a first camera of the client device, and wherein the sensor data indicating that the position of the user changes such that the user is positioned to view a second display device of the client device includes detecting the user with a field of view of a second camera of the client device.

In some aspects, the techniques described herein relate to a method, further including: detecting that the user moves out of the field of view of the first camera; and notifying the second camera to scan for the user within the field of view of the second camera.

The invention claimed is:

1. A client device comprising:
   a first housing foldably attached to a second housing via a hinge;
   a first display device positioned at a first surface of the first housing and a second display device positioned at a second surface of the first housing;
   a sensor system including one or more sensors; and
   one or more modules implemented at least in part in hardware of the client device to:
      detect speech content from a user adjacent the first surface of the first housing of the client device;
      cause, based at least in part on detection of the speech content from the user adjacent the first surface, media content to be output via the first display device based on detecting that a user is positioned to view the first display device;
      receive sensor data from the sensor system indicating a change in a position of the user such that the user is positioned to view the second display device, the sensor data comprising speech content detected from the user adjacent the second surface of the first housing of the client device; and
      cause, based on the change in the position of the user, the media content to be output on the second display device.

2. The client device of claim 1, wherein the sensor data further comprises an indication that the client device is in an open position based on a position of the first housing relative to the second housing.

3. The client device of claim 2, wherein the indication that the client device is in an open position is based at least in part on detecting a position of the hinge relative to one or more of the first housing or the second housing.

4. The client device of claim 1, wherein the one or more modules are further implemented to output the media content via a first audio device based on detecting that the user is positioned to view the first display device, and to switch output of the media content to a second audio device based on the change in the position of the user.

5. The client device of claim 1, wherein the one or more modules are further implemented to stop output of the media content via the first display device based on the change in the position of the user.

6. The client device of claim 1, wherein the sensor data comprises image data indicating that the user is detected within a field of view of a camera positioned at the second surface of the first housing of the client device.

7. The client device of claim 1, wherein the sensor data comprises audio data indicating that the speech content from the user is detected at the second surface of the first housing of the client device.

8. The client device of claim 1, wherein the detecting that the user is positioned to view the first display device is based at least in part on detecting the user within a field of view of a first camera positioned at the first surface of the first housing of the client device, and wherein the one or more modules are further implemented to:
   detect that the user moves out of the field of view of the first camera; and
   notify a second camera positioned at the second surface of the first housing to scan for an image of the user.

9. The client device of claim 1, wherein the first surface of the first housing comprises a front surface of the first housing and the second surface of the first housing comprises a rear surface of the first housing.

10. A system comprising:
   one or more processors; and
   one or more computer-readable storage media storing instructions that are executable by the one or more processors to:
      detect that a first housing of a client device is positioned in an open position relative to a second housing of the client device;
      detect speech content from a user adjacent a first surface of the first housing of the client device;
      cause, based at least in part on detection of the speech content from the user adjacent the first surface, media content to be output via a first display device positioned at the first surface of the first housing based on detecting that a user is positioned to view the first display device;
      receive sensor data from a sensor system indicating that a position of the user changes such that the user is positioned to view a second display device positioned at a second surface of the first housing of the client device, the sensor data indicating that speech content from the user is detected adjacent the second surface of the first housing of the client device; and
      cause, based on the change in the position of the user, the media content to be output on the second display device.

11. The system of claim 10, wherein to detect that the first housing of the client device is positioned in an open position relative to the second housing of the client device is based on detecting an orientation of a hinge that connects the first housing to the second housing.

12. The system of claim 10, wherein to cause the media content to be output via the first display device is based on to detect an image of the user within a field of view of a first camera positioned at the first surface of the first housing of the client device, and wherein the sensor data from the sensor system indicating that a position of a user changes such that the user is positioned to view a second display comprises an indication that an image of the user is detected within a field of view of a second camera positioned at the second surface of the first housing of the client device.

13. The system of claim 10, wherein detecting that the user is positioned to view the first display device is based at least in part on detecting the user within a field of view of a first camera positioned at the first surface of the first housing of the client device, and wherein the instructions are further executable by the one or more processors to:
   detect that the user moves out of the field of view of the first camera; and
   notify a second camera positioned at the second surface of the first housing to scan for an image of the user.

14. The system of claim 10, and wherein the instructions are further executable by the one or more processors to stop output of the media content on the first display device in response to output of the media content on the second display device.

15. The system of claim 10, wherein the instructions are further executable by the one or more processors to output the media content via a first audio device based on detecting that the user is positioned to view the first display device, and to switch output of the media content to a second audio device based on the change in the position of the user.

16. The system of claim 10, wherein the instructions are further executable by the one or more processors to:
   receive further sensor data from the sensor system indicating that the position of a user further changes such that the user is positioned to view the first display device;
   cause, based on the further change in the position of the user, the media content to be output on the first display device; and
   cause output of the media content via the second display device to stop.

17. A method, comprising:
   monitoring a position of a user relative to a first display device of a client device;
   detecting speech content from the user adjacent the first display device of the client device;
   causing media content to be output via the first display device based on detecting that the user is positioned to view the first display device and based at least in part on detecting the speech content from the user adjacent the first display device of the client device;
   receiving sensor data from a sensor system indicating that a position of the user changes such that the user is positioned to view a second display device of the client device, the sensor data comprising speech content detected from the user adjacent the second display device of the client device; and
   causing, based on the change in the position of the user, the media content to be output on the second display device.

18. The method of claim 17, wherein the client device comprises a first housing attached to a second housing via a hinge, the first display device is positioned at a first surface of the first housing, the second display device is positioned at a second surface of the first housing, and wherein said monitoring the position of the user relative to the first display device is based at least in part on:
   determining that the client device is in an open position based on a position of the first housing relative to the second housing; and
   determining that the media content is to be output via the client device.

19. The method of claim 17, wherein detecting that the user is positioned to view the first display device is based on detecting the user within a field of view of a first camera of the client device, and wherein the sensor data indicating that the position of the user changes such that the user is positioned to view a second display device of the client device comprises detecting the user with a field of view of a second camera of the client device.

20. The method of claim 19, further comprising:

detecting that the user moves out of the field of view of the first camera; and notifying the second camera to scan for the user within the field of view of the second camera.

* * * * *